United States Patent [19]
Holder

[11] Patent Number: 6,163,324
[45] Date of Patent: Dec. 19, 2000

[54] MEDIAN CALCULATION USING SIMD OPERATIONS

[75] Inventor: Marc Holder, Mercer Island, Wash.

[73] Assignee: Microsoft Corporation, Redmond, Wash.

[21] Appl. No.: 09/107,866

[22] Filed: Jun. 30, 1998

[51] Int. Cl.$^7$ .............................. G06F 15/80; G06F 17/10
[52] U.S. Cl. ......................... 345/505; 345/513; 382/262; 708/304
[58] Field of Search ..................................... 345/501–506, 345/513, 514, 203; 382/262; 708/304

[56] References Cited

U.S. PATENT DOCUMENTS

| | | | |
|---|---|---|---|
| 5,408,675 | 4/1995 | Florentino et al. | 345/334 |
| 5,532,948 | 7/1996 | Kohno et al. | 708/207 |
| 5,862,064 | 1/1999 | Bae et al. | 708/304 |
| 5,900,006 | 5/1999 | Yoon | 708/202 |
| 6,058,405 | 5/2000 | Kolte et al. | 708/304 |
| 6,058,473 | 5/2000 | Guttag et al. | 712/225 |

OTHER PUBLICATIONS

P. Hsieh et al., "An Area–Efficient Median Filtering IC for Image/Video Applications", IEEE Transaction of Consumer Electronics, vol. 39, No. 3, Aug. 1993, pp. 504–509.

P. Kolte et al., "A Fast Median Filter Using AltiVec", International Conference on Computer Design (ICCD'99), 1999, pp. 384–391.

Primary Examiner—Ulka J. Chauhan
Attorney, Agent, or Firm—Lee & Hayes, PLLC

[57] ABSTRACT

A method of finding median values from different sets of values includes a step of forming a plurality of bit registers. Each bit register has bit groups corresponding respectively to the different sets of values, and each bit group has bit positions corresponding respectively to different individual ones of the values of the corresponding set. Bits in different bit registers at bit positions corresponding to a particular one of the given values indicate the truth or falsity of different possible relationships between the particular given value and other individual ones of the given values in the same set. The method includes a further step of logically ANDing different combinations of the bit registers to form a plurality of parallel condition registers having bit positions corresponding respectively to different individual ones of the given values of the different sets. The parallel condition registers are evaluated to determine the median values of the different sets—a true value at any particular bit position in any of the parallel condition registers indicates that the given value corresponding to that particular bit position is the median value of its set. The data structures employed in the above steps are particularly well adapted to single-instruction multiple data (SIMD) operations, which produce efficiencies based on parallel processing.

38 Claims, 4 Drawing Sheets

MEDIAN CALCULATION USING SIMD OPERATIONS

TECHNICAL FIELD

This invention relates to methods and systems of finding median values from sets of values, using computers and other processing systems that are capable of single-instruction/multiple-data (SIMD) operations.

BACKGROUND OF THE INVENTION

Computers almost invariably utilize raster-type display devices for presenting information to users. A cathode ray tube (CRT) is an example of a raster-type display device. In such display devices, images are composed of a to plurality of visible picture elements or dots, commonly referred to as pixels. The pixels are arranged in a two-dimensional array having rows and columns. Each pixel has a single color, specified from a large palette of colors. When spaced very closely, the individual pixels are indiscernible to a human viewer, and the image appears to have been painted in continuous tones over the surface of the display device.

The discrete nature of the pixels is useful when representing images in digital formats—each pixel can be conveniently specified as a number that corresponds to a specific color. However, in the process of capturing an image into digital form, various sources of noise may degrade the image. This noise causes the pixel values to deviate from their "true" values. Computers often employ some form of filtering to remove noise such as this from viewed images. One method of filtering is to replace each pixel with the average of its adjacent pixels. Another filtering method involves replacing each pixel with the median of its adjacent pixels. A median filter is typically used to mitigate the effects of "impulse" noise or "shot" noise.

To illustrate this process, FIG. 1 shows a matrix or array of individual pixels, wherein each pixel 12 is represented as a grid square. Five of the pixels are arbitrarily labeled as pixels a, b, c, d, and e.

Assume that in the example of FIG. 1, it is desired to filter pixel d. In this example, the pixel d will be replaced by the average of it and its orthogonally-adjacent pixels a, b, c, and e. Thus, filtering pixel d involves finding the average pixel value from among pixels a, b, c, d, and e. This task is repeated for every single pixel of the image. One way to accomplish this, in conventional microprocessors, is to assign the five pixel values to five different registers, add the registers together, and divide the result by five. However, this can consume significant processor resources, since it needs to be done for every pixel. Many images contain over one million pixels. This can create severe processing bottlenecks.

Modern microprocessors have special instructions that are intended to reduce or eliminate bottlenecks such as this. Such instructions are generally referred to as "single-instruction/multiple-data" (SIMD) instructions. In microprocessors manufactured by Intel Corporation, such instructions are referred to as multimedia extensions (MMX). In microprocessors manufactured by Digital Corporation, such instructions are referred to as motion video instructions (MVI).

SIMD instructions and operations are very useful in many signal processing operations. Generally, they allow registers to be grouped as an array, so that an operation can be carried out in parallel on each of the registers. For example, the individual registers of one group or array can be added to the corresponding registers of another group or array using only a single instruction and using parallel arithmetic processing units of a microprocessor (a set of grouped registers is alternatively referred to as a "wide" register or an "MMX" register, having constituent bytes, words, or double words). This is a great advantage in graphics operations, where similar operations must be performed repetitively on all the pixels of an image.

FIG. 2 shows an example of an SIMD operation. FIG. 2 shows a first SIMD array 20. This is a grouping of three separate pixel value registers R1, R2, and R3. Each of these registers contains a single pixel value. A second SIMD register 22 is a grouping of three additional pixel registers R4, R5, and R6, each containing further pixel values. Result registers R7, R8, and R9 are contained in a third SIMD array 24.

In this example, it is desired to calculate R7, R8, and R9 such that R7=R1+R4; R8=R2+R5; and R9=R3+R6. Rather than conducting three different addition operations, a single SIMD instruction is used to accomplish this result. When executing such an instruction, a microprocessor performs each of the three discrete operations in parallel, resulting in a significant gain in speed. Popular processors are capable of operating on as many as eight different values in parallel rather than the three illustrated in FIG. 2.

It is not difficult to see how SIMD operations can be used to speed graphics operations such as an averaging operation. Instead of averaging each pixel individually, the averaging process is carried out in parallel for five different pixels, using the five parallel registers of each SIMD array. The first registers of the SIMD arrays are used for the first set of values that are to be averaged, the second registers of the SIMD arrays are used for the second set of values that are to be averaged, and so on. Thus, five pixels can be filtered in little more than the time that would otherwise have been required to filter only a single pixel.

SIMD operations work well for simple algorithms where operations can be conducted in parallel on different sets of values-where defined operations are applied non-conditionally to each set of values. Finding a median value, however, is not as simple. When finding a median value, it is generally necessary to compare different pixel values and to sort them as a result of such a comparison—certain mathematical operations will be applied in one case, but not in another.

This is illustrated in FIG. 3, which shows a comparison 30 of pixels a and b. One action 31 is performed if a is greater than b. Another action 32 (or possibly no action) is performed if a is less than b. FIG. 3 illustrates that two divergent processing branches are required to perform this logic.

SIMD instructions do not provide this type of conditional logic. If one SIMD action or operation is applied to one value in an SIMD array, the same action or operation is necessarily applied to all values in the array. Thus, it has previously not been possible to effectively utilize SIMD instructions when calculating median values.

As a result, calculating median values remains a significant processing bottleneck in spite of the availability of SIMD operations.

SUMMARY OF THE INVENTION

The invention is a system and method for finding median values in a way that can be optimized by the use of SIMD instructions. In accordance with the invention, a Boolean table or matrix is constructed using a plurality of bit registers. Each bit register has bit positions forming columns that correspond to the available values from which a median is sought. Bits in a single column indicate the truth or falsity of different possible relationships between the value corresponding to that column and the other values.

Different combinations of the bit registers are logically ANDed to form a plurality of parallel condition registers having bit positions corresponding to the available values. A true value at any particular bit position in any of the parallel condition registers indicates that the value corresponding to that bit position is the median value.

The data structures and calculations used in the disclosed methods can be implemented with SIMD registers, thereby taking advantage of the parallel processing capabilities of such registers and resulting in efficiencies which have not previously been possible.

DETAILED DESCRIPTION

Figure 2:
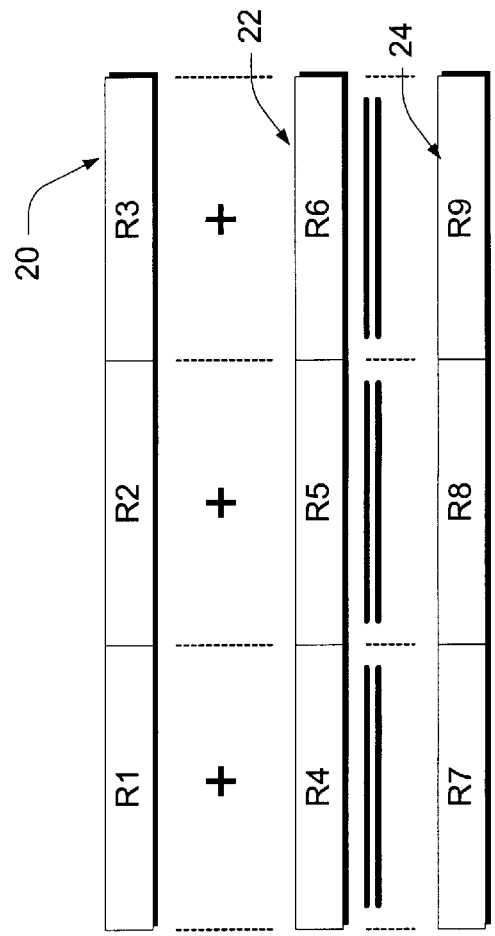
FIG. 2 illustrates an example of SIMD calculations.

FIG. 2 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by remote processing devices that are linked through a communications network. In a distributed computer environment, program modules may be located in both local and remote memory storage devices.

With reference to FIG. 2, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs) read only memories (ROM), and the like, may also be used in the exemplary operating environment.

A number of program modules may be stored on the hard disk, magnetic disk 29 optical disk 31, ROM 24, or RAM 25, including an operating system 35, one or more application programs 36, other program modules 37, and program data 38. A user may enter commands and information into the personal computer 20 through input devices such as keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, personal computers typically include other peripheral output devices (not shown) such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Generally, the data processors of computer 20 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer, such as video adapter 48, may be programmed to perform the functions and steps described below. The invention includes such sub-components when they are programmed as described.

For purposes of illustration, programs and other executable program components such as the operating system are illustrated herein as discrete blocks, although it is recognized that such programs and components reside at various times in different storage components of the computer, and are executed by the data processor(s) of the computer.

In accordance with the invention, application programs 36 include a video processing program that performs graphics tasks. Such tasks include graphics smoothing, which involves a process of finding a median pixel or pixel value from a plurality of such values as described above in the "Background" section of this document. More generally, the invention is useful in any situation where it is desired to find the median value from a plurality of given values. The invention is especially useful when there are many sets of values for which individual medians are sought.

Figure 4:
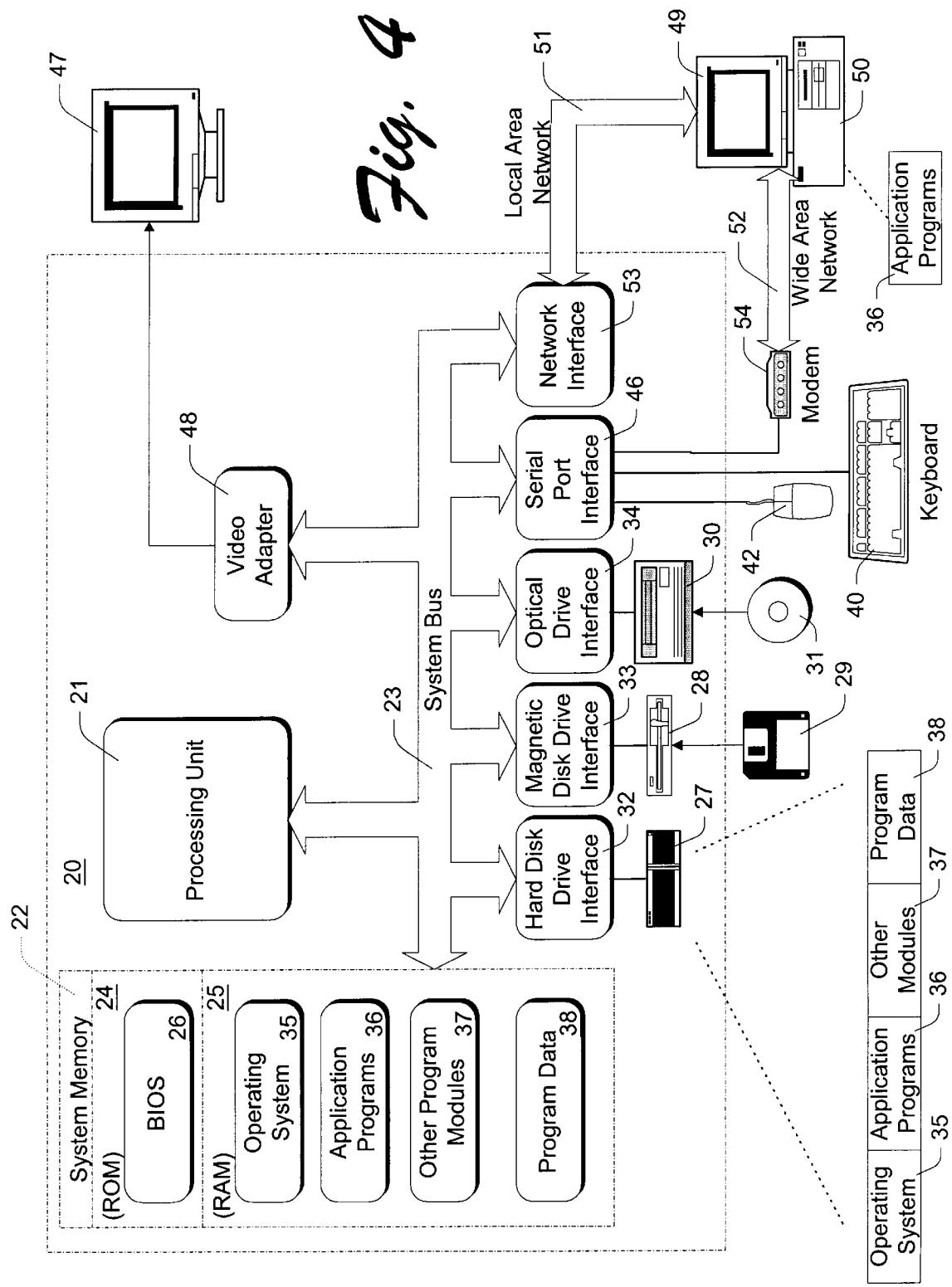
FIG. 4 is a block diagram of a computer system in accordance with the invention.
Figure 5:
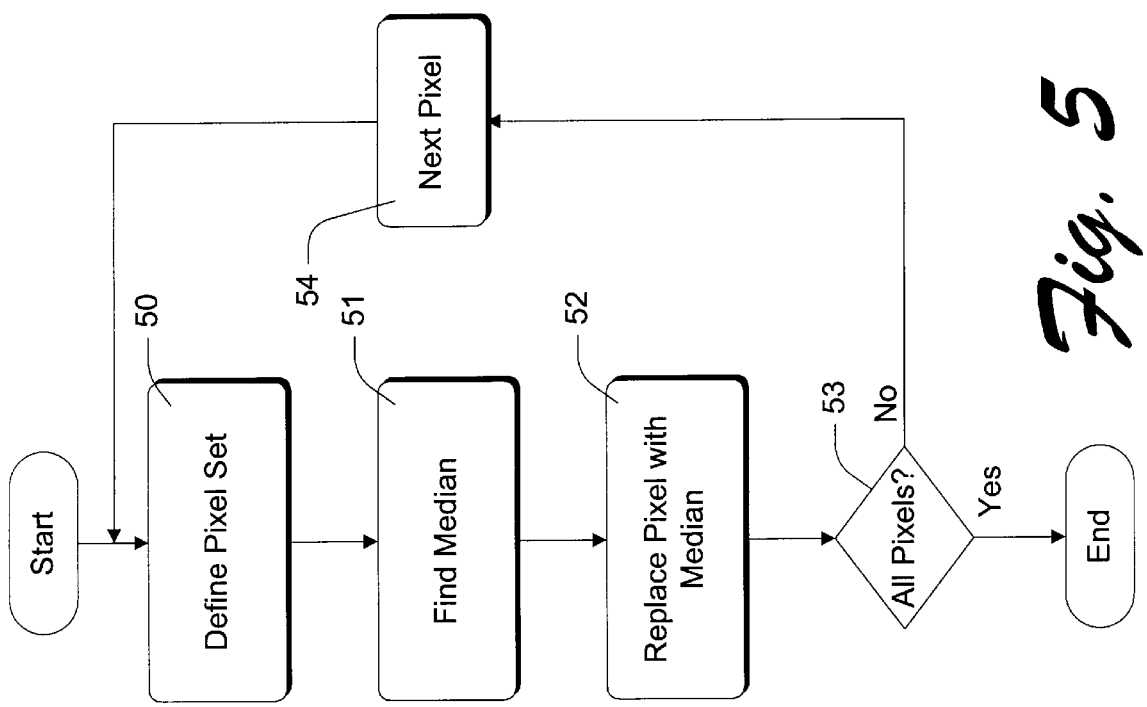
FIG. 5 is a flowchart showing steps in filtering an image pixel.

The invention will be discussed in conjunction with the flowcharts of FIGS. 3 and 4, with tables and equations set forth below, and also in relation to specific examples in which it is desired first to find the median of three given values, a, b, and c, and in a second example to find the median of five given values a, b, c, d, and e.

Figure 1:
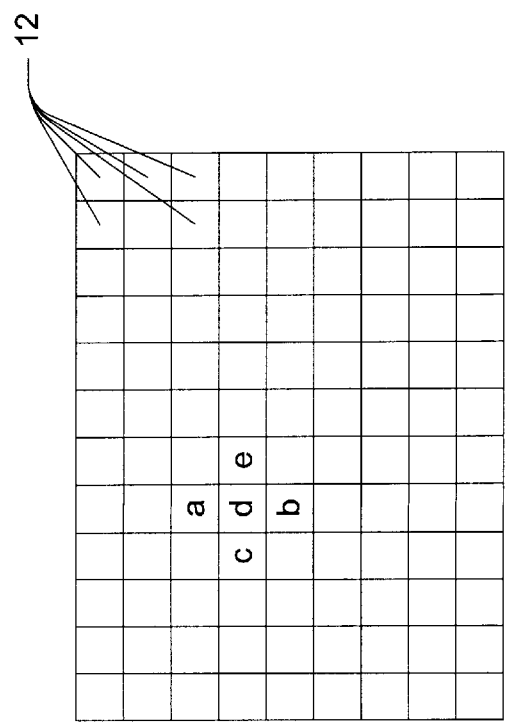
FIG. 1 illustrates an orthogonal layout of graphics pixels.
Figure 3:
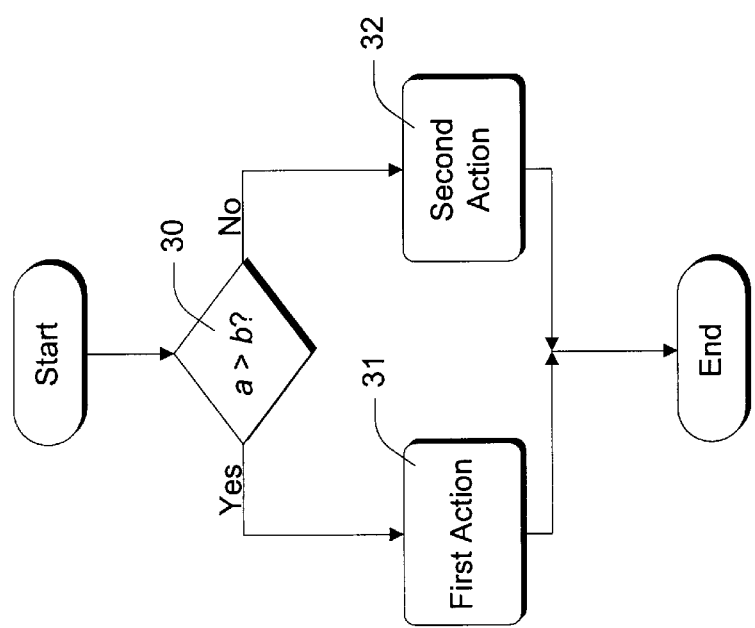
FIG. 3 is a flowchart showing steps performed in comparing two pixel values.

FIG. 3 shows steps performed in smoothing or filtering an image containing pixels and pixel values as illustrated in FIG. 1. A first step 50 comprises defining a set of pixel values consisting of the particular pixel d which is to be filtered and its orthogonally-adjacent pixels a, b, c, and e. A subsequent step 51 comprises finding the median of pixels a, b, c, d, and e. Step 52 comprises replacing pixel d with the median value found in step 51. Step 53 comprises determining whether all pixels of the image have been filtered. If they have not, a subsequent pixel (step 54) becomes the object of further repetitions of steps 50–53. The process ends when all pixels have been filtered.

Figure 6:
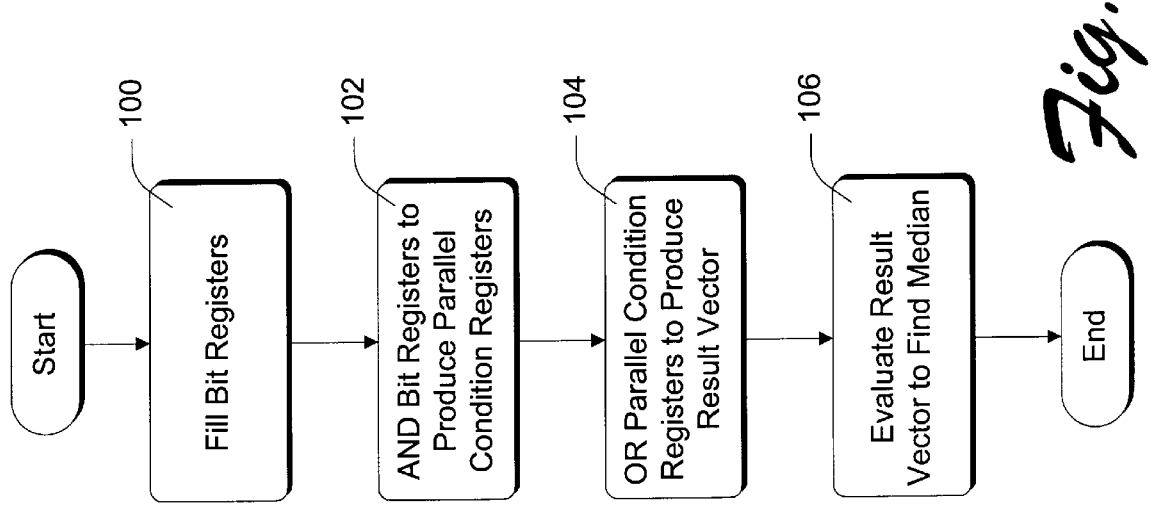
FIG. 6 is a flowchart showing steps in accordance with the invention for calculating a median value of a set of pixels.

FIG. 6 illustrates the process 51 of finding the median pixel from a defined set of pixels. Generally, a step 100 comprises filling a data structure with bits corresponding to different relationships between individual values of the defined set of pixels. A step 102 comprises logically ANDing rows of the data structure to produce another data structure containing what are referred to as parallel condition registers. A step 104 comprises logically ORing certain rows of this second data structure to produce a result vector. Step 106 comprises evaluating the result vector to find the median value.

In more detail, a step 100 in accordance with the invention comprises forming a plurality of bit registers having bit positions corresponding respectively to different individual ones of the given values. The registers form a relationship matrix or table having rows and columns. The rows are formed by the registers, and the columns are formed by the different bit positions of the registers-a single column is formed by bits in the different bit registers at a bit position corresponding to a particular value. Each bit indicates the truth or falsity of a particular relationship or inequality between two of the available values. More specifically, each bit indicates whether one of the values is greater than another of the values. For example, one bit might indicate whether "a>b" is true or false.

Within a given column, corresponding to a given value, the bits indicate the truth or falsity of every possible inequality relationship between the given value and the other values. If there are n available values, there are 2(n−1) different possible relationships between any given value and the remaining values. Accordingly, there are 2(n−1) bit registers.

The rows can be formed in memory. However, SIMD registers are advantageously used to hold individual rows when performing calculations involving entire rows. This utilizes the parallel processing capabilities that are possible with SIMD instructions. In current microprocessors, SIMD registers are 64 bits in width, allowing concurrent processing of 64 columns, although some implementations of the invention will not utilize all of the available bits. The use of SIMD registers in implementing the invention will be described more fully after setting forth the first example.

In an example limited to calculating the median value from a set of three values, a, b, and c, the relationship table has three columns or bit positions. Each column or bit position corresponds respectively to a different one of the three given values a, b, or c. The three columns will be referred to as columns a, b, and c. For purposes of this example, it will be assumed that each row is formed by a single storage register having three bits (although it is recognized that actual computers rarely have fewer than eight bits in any given register).

For any one of the three values a, b, and c, there are four different possible inequality relationships between that value and the remaining values. Thus, there are four different inequality relationships involving value a: a>b, a>c, a<b, and a<c. Each of these relationships is represented in column a of the relationship table. The four possible relationships involving value b are represented in column b. The four possible relationships involving value c are represented in column c. Table 1 shows how the relationships are represented in the relationship table for each of values a, b, and c.

TABLE 1

|  | a | b | c |
| --- | --- | --- | --- |
| R1 | a > b | b > a | c > a |
| R2 | a > c | b > c | c > b |
| R3 | a < b | b < a | c < a |
| R4 | a < c | b < c | c < b |

The relationship table is comprised of four 3-bit registers R1, R2, R3, and R4, that form the rows of the table. Each bit register has multiple bit positions (in this case, three bit positions). The first or highest-order bit position corresponds to value a. The second bit position corresponds to value b. The third or lowest-order bit position corresponds to value c. The bits of the bit registers can be thought of as being arranged in columns corresponding to the respective values. In the example table above, the columns are labeled a, b, and c. Each cell in the table is eventually set to either 0 or 1 (false or true, respectively), depending on whether the corresponding relationship is met. Thus, the cell at R1 and column a is set to 1 if a>b; otherwise, that cell is set to 0.

As a specific example, suppose that a=6, b=5, and c=9. The resulting relationship table is filled as shown in Table 2, based on the relationships shown in Table 1:

TABLE 2

|    | a | b | c |
|----|---|---|---|
| R1 | 1 | 0 | 1 |
| R2 | 0 | 0 | 1 |
| R3 | 0 | 1 | 0 |
| R4 | 1 | 1 | 0 |

Even though the table contains twelve possible relationships, it is not necessary to explicitly evaluate twelve relationships in order to fill the table. Rather, many of the relationships are either duplicates or opposites of other relationships and can therefore be copied without evaluating the inequality again. For example, the relationship at row 1, column 2, is the same as the relationship at row 3, column 1. As another example, the last two relationships of each column are merely inverses of the first two relationships in the same column.

Now, if a is the median, one of the following two conditions will be true:

(1) (a>b)AND(a<c) or (2) (a<b)AND(a>c)

Referring Table 1, condition (1) is equivalent to the expression "R(a,1) AND R(a,4)", where R(x,y) indicates the value at column x, row y of the relationship table. Similarly, condition (2) is equivalent to the expression "R(3,c) AND R(2,a)". Thus, a is the median if the following condition is true:

(3) (R(a,1) AND R(a,4)) OR (R(a,3) AND R(a,2))

If b is the median, one of the following conditions will be true:

(4) (b>a) AND (b<c) or (5) (b<a) AND (b>c)

These conditions can also be stated in terms of rows and columns of the relationship table, as follows:

(6) (R(b,1) AND R(b,4)) OR (R(b,3) AND R(b,2))

Similarly, c is the median if the following condition is met:

(7) (R(c,1) AND R(c,4)) OR (R(c,3) AND R(c,2)) Stated more generally, a particular value i is the median if and only if the following condition is met:

(8) (R(i,1) AND R(i,4)) OR (R(i,3) AND R(i,2))

Assuming that only one value is the median, the immediately preceding condition will be met for only one of the available values.

Rather than evaluating this expression three different times for each of the three values a, b, and c, a step 102 is performed of logically ANDing different combinations of the bit registers R1, R2, R3, and R4 to form a plurality of parallel condition registers P1 and P2 having bit positions that correspond respectively to the values of the set being evaluated:

(9) P1=R1 AND R4

(10) P2=R3 AND R2

Using the specific numerical example given above, where a=6, b=5, and c=9, the result is as shown in Table 3:

TABLE 3

|    | a | b | c |
|----|---|---|---|
| P1 | 1 | 0 | 0 |
| P2 | 0 | 0 | 0 |

The parallel condition registers can be evaluated to determine the median value: a true value at any particular bit position in any of the parallel condition registers P1 and P2 indicates that the value corresponding to that bit position is the median value. In this example, there is a 1 in column a, indicating that value a is the median. More formally, a step 104 is performed of logically ORing the parallel condition registers P1 and P2 to produce a result vector or register V1:

(11) V1=P1 OR P2

This is equivalent to expression (8) above, except that it contains columnized results for all values i. After the above calculations, result vector V1 will have one or more bits that are set to "1". If there is only one median value, only one bit will be set. A true value at any particular bit position of result register V1 indicates that the value corresponding to that particular bit position is the median value. Thus, a simple evaluation of V1 (step 106 in FIG. 3) indicates which of the available values is the median. Expressed in tabular format, and continuing the example above:

TABLE 4

|    | a | b | c |
|----|---|---|---|
| V1 | 1 | 0 | 0 |

Since there is a true value in column a, value a is the median.

The advantage of this method over prior art methods is that it allows parallel processing to simultaneously find median values for multiple sets of values. In the example above, where each set includes three values, a single-byte register can be used to represent two different sets as follows:

TABLE 5

|    | ← | Set 1 | → | ← | Set 2 | → |
|----|---|---|---|---|---|---|
|    | $a_1$ | $b_1$ | $c_1$ | $a_2$ | $b_2$ | $c_2$ |
| R1 | $a_1 > b_1$ | $b_1 > a_1$ | $c_1 > a_1$ | $a_2 > b_2$ | $b_2 > a_2$ | $c_2 > a_2$ |
| R2 | $a_1 > c_1$ | $b_1 > c_1$ | $c_1 > b_1$ | $a_2 > c_2$ | $b_2 > c_2$ | $c_2 > b_2$ |
| R3 | $a_1 < b_1$ | $b_1 < a_1$ | $c_1 < a_1$ | $a_2 < b_2$ | $b_2 < a_2$ | $c_2 < a_2$ |
| R4 | $a_1 < c_1$ | $b_1 < c_1$ | $c_1 < b_1$ | $a_2 < c_2$ | $b_2 < c_2$ | $c_2 < b_2$ |

Thus, each of registers R1, R2, R3, and R4 includes bit groups corresponding respectively to different sets of values. Each bit group has bit positions corresponding respectively to different individual ones of the values of the corresponding set. Bits in a bit position corresponding to a particular value indicate the truth or falsity of different possible relationships between the particular value and the other values of the same set.

The parallel condition registers have identical bit positions as follows:

TABLE 6

|  | ← | Set 1 | → | ← | Set 2 | → |
|  | $a_1$ | $b_1$ | $c_1$ | $a_2$ | $b_2$ | $c_2$ |
|---|---|---|---|---|---|---|
| P1 | | | | | | |
| P2 | | | | | | |

P1 and P2 are calculated according to equations (9) and (10) above—the second set of values does not add any extra computational overhead.

The result vector also has bit positions for the values of the two different sets:

TABLE 7

|  | ← | Set 1 | → | ← | Set 2 | → |
|  | $a_1$ | $b_1$ | $c_1$ | $a_2$ | $b_2$ | $c_2$ |
|---|---|---|---|---|---|---|
| V1 | | | | | | |

V1 is calculated according to equation (11) above, from P1 and P2. A true value at any particular bit position of the result vector indicates that the value corresponding to that particular bit position is the median value of its set. Thus, two sets of values can be evaluated in parallel after filling the relationship table as shown in Table 6.

Even further parallelism can be achieved with processors that support SIMD operations. Such processors allow parallel operations on wide registers having multiple words or bytes that, together, can include sixty-four or more bit positions. With sixty-four-bit rows such as those formed by SIMD registers, tables such as those discussed above can have sixty-four columns-thereby containing twenty-one sets of values (assuming three values a, b, and c in each set). In a more realistic example where each set has five values, twelve sets can be evaluated in parallel, thereby taking advantage of the parallel processing capacities of modern multimedia processors. In many situations, it may be more efficient to use a single word or byte of an MMX wide register for each set of values, even though some of the bit positions in each byte may not be used.

In light of the discussion and rather simple example given above, involving only three values in a particular set, the following discussion illustrates how to implement the invention to find median pixel values for sets comprised of five pixels. FIG. 1 shows a possible arrangement of pixels in which it is desired to find the median pixel value from five possible pixels a, b, c, d, and e.

The first step is to list the different possible sets of relationships that would be satisfied if any particular value were the median. For example, value a could be the median in any one of six different ways:

(12) (a>b) AND (a>c) AND (a<d) AND (a<e) or

(13) (a>b)AND(a>d)AND(a<c)AND(a<e) or

(14) (a>b) AND (a>e) AND (a<c) AND (a<d) or

(15) (a>c) AND (a>d) AND (a<b) AND (a<e) or

(16) (a>c)AND(a>e)AND(a<b)AND(a<d) or

(17) (a>d)AND(a>e)AND(a<b)AND(a<c)

Table 8 below shows corresponding groups of ANDed conditions for each of values a, b, c, d, and e. Each group of conditions under a given column, if satisfied, indicates that the value corresponding to the column is the median.

TABLE 8

| a | b | c | d | e |
|---|---|---|---|---|
| a > b | b > a | c > a | d > a | e > a |
| a > c | b > c | c > b | d > b | e > b |
| a < d | b < d | c < d | d < c | e < c |
| a < e | b < e | c < e | d < e | e < d |
| a > d | b > d | c > d | d > c | e > c |
| a > e | b > e | c > e | d > e | e > d |
| a < b | b < a | c < a | d < a | e < a |
| a < c | b < c | c < b | d < b | e < b |
| a > b | b > a | c > a | d > a | e > a |
| a > d | b > d | c > d | d > c | e > c |
| a < c | b < c | c < b | d < b | e < b |
| a < e | b < e | c < e | d < e | e < d |
| a > c | b > c | c > b | d > b | e > b |
| a > e | b > e | c > e | d > e | e > d |
| a < b | b < a | c < a | d < a | e < a |
| a < d | b < d | c < d | d < c | e < c |
| a > b | b > a | c > a | d > a | e > a |
| a > e | b > e | c > e | d > e | e > d |
| a < c | b < c | c < b | d < b | e < b |
| a < d | b < d | c < d | d < c | e < c |
| a > c | b > c | c > b | d > b | e > b |
| a > d | b > d | c > d | d > c | e > c |
| a < b | b < a | c < a | d < a | e < a |
| a < e | b < e | c < e | d < e | e < d |

Table 8, referred to herein as an assignment table, can be used to arrange a relationship table and to determine which bit registers should be ANDed to form the parallel condition registers. Note that in this case, the relationship table will have eight rows or bit registers. The bit registers will be referred to as R1 through R8. There will be six parallel condition registers, referred to as P1 through P6. Generally, the number of parallel condition registers will be given by the equation $$(n-1)! \bigg/ \left[\left(\frac{n-1}{2}\right)!\right]^2, \qquad (18)$$

where n is the number of available values from which a median is sought

The assignment table of Table 8 is augmented by assigning each listed inequality to one of the eight available bit registers. Starting with a single column, such as column a, the eight different possible relationships involving a are assigned to different bit registers or rows, as shown in Table 9. The eight different relationships in each of the other columns are also assigned to registers. The assignments are made so that each cell of a single row indicates the same set of bit registers: each cell of the first row indicates R1, R2, R3, and R4; each cell of the second row contains R5, R6, R7, and R8. For this to be possible, the second row should contain inequalities that are the inverse of those in the first row.

TABLE 9

| a | b | c | d | e |
|---|---|---|---|---|
| a > b→R1 | b > a→R1 | c > a→R1 | d > a→R1 | e > a→R1 |
| a > c→R2 | b > c→R2 | c > b→R2 | d > b→R2 | e > b→R2 |
| a < d→R3 | b < d→R3 | c < d→R3 | d < c→R3 | e < c→R3 |
| a < e→R4 | b < e→R4 | c < e→R4 | d < e→R4 | e < d→R4 |
| a > d→R5 | b > d→R5 | c > d→R5 | d > c→R5 | e > c→R5 |
| a > e→R6 | b > e→R6 | c > e→R6 | d > e→R6 | e > d→R6 |
| a < b→R7 | b < a→R7 | c < a→R7 | d < a→R7 | e < a→R7 |
| a < c→R8 | b < c→R8 | c < b→R8 | d < b→R8 | e < b→R8 |
| a > b | b > a | c > a | d > a | e > a |

TABLE 9-continued

| a | b | c | d | e |
|---|---|---|---|---|
| a > d | b > d | c > d | d > c | e > c |
| a < c | b < c | c < b | d < b | e < b |
| a < e | b < e | c < e | d < e | e < d |
| a > c | b > c | c > | d > b | e > b |
| a > e | b > e | c > e | d > e | e > d |
| a < b | b < a | c < a | d < a | e < a |
| a < d | b < d | c < d | d < c | e < c |
| a > b | b > a | c > a | d > a | e > a |
| a > e | b > e | c > e | d > e | e > d |
| a < c | b < c | c < b | d < b | e < b |
| a < d | b < d | c < d | d < c | e < c |
| a > c | b > c | c > b | d > b | e > b |
| a > d | b > d | c > d | d > c | e > c |
| a < b | b < a | c < a | d < a | e < a |
| a < e | b < e | c < e | d < e | e < d |

After this initial assignment, the remaining relationships in each column (which are all duplicates of the relationships already assigned) are assigned to the registers. These new assignments are made, within each column, consistently with the assignments already made. Thus, a given inequality within a single column, such as "a>c", is always assigned to the same bit register: "a>c" is always assigned to R2 within column a. The complete table of assignment is shown in Table 10.

TABLE 10

| | a | b | c | d | e |
|---|---|---|---|---|---|
| P1 | a > b→R1 | b > a→R1 | c > a→R1 | d > a→R1 | e > a→R1 |
| (R1&R2& | a > c→R2 | b > c→R2 | c > b→R2 | d > b→R2 | e > b→R2 |
| R3&R4) | a < d→R3 | b < d→R3 | c < d→R3 | d < c→R3 | e < c→R3 |
| | a < e→R4 | b < e→R4 | c < e→R4 | d < e→R4 | e < d→R4 |
| P2 | a > d→R5 | b > d→R5 | c > d→R5 | d > c→R5 | e > c→R5 |
| (R5&R6& | a > e→R6 | b > e→R6 | c > e→R6 | d > e→R6 | e > d→R6 |
| R7&R8) | a < b→R7 | b < a→R7 | c < a→R7 | d < a→R7 | e < a→R7 |
| | a < c→R8 | b < c→R8 | c < b→R8 | d < b→R8 | e < b→R8 |
| P3 | a > b→R1 | b > a→R1 | c > a→R1 | d > a→R1 | e > a→Rl |
| (R1&R5& | a > d→R5 | b > d→R5 | c > d→R5 | d > c→R5 | e > c→R5 |
| R8&R4) | a < c→R8 | b < c→R8 | c < b→R8 | d < b→R8 | e < b→R8 |
| | a < e→R4 | b < e→R4 | c < e→R4 | d < e→R4 | e < d→R4 |
| P4 | a > c→R2 | b > c→R2 | c > b→R2 | d > b→R2 | e > b→R2 |
| (R2&R6& | a > e→R6 | b > e→R6 | c > e→R6 | d > e→R6 | e > d→R6 |
| R7&R3) | a < b→R7 | b < a→R7 | c < a→R7 | d < a→R7 | e < a→R7 |
| | a < d→R3 | b < d→R3 | c < d→R3 | d < c→R3 | e < c→R3 |
| P5 | a > b→R1 | b > a→R1 | c > a→R1 | d > a→R1 | e > a→R1 |
| (R1&R6& | a > e→R6 | b > e→R6 | c > e→R6 | d > e→R6 | e > d→R6 |
| R8&R3) | a < c→R8 | b < c→R8 | c < b→R8 | d < b→R8 | e < b→R8 |
| | a < d→R3 | b < d→R3 | c < d→R3 | d < c→R3 | e < c→R3 |
| P6 | a > c→R2 | b > c→R2 | c > b→R2 | d > b→R2 | e > b→R2 |
| (R2&R5& | a > d→R5 | b > d→R5 | c > d→R5 | d > c→R5 | e > c→R5 |
| R7&R4) | a < b→R7 | b < a→R7 | c < a→R7 | d < a→R7 | e < a→R7 |
| | a < e→R4 | b < e→R4 | c < e→R4 | d < e→R4 | e < d→R4 |

A left column has been added to Table 10 indicating that each row of this table corresponds to a parallel condition register. A given parallel condition register is calculated by ANDing the registers indicated in the corresponding row of the table as follows:

(19) P1=R1 AND R2 AND R3 AND R4

(20) P2=R5 AND R6 AND R7 AND R8

(21) P3=R1 AND R5 AND R8 AND R4

(22) P4=R2 AND R6 AND R7 AND R3

(23) P5=R1 AND R6 AND R8 AND R3

(24) P6=R2 AND R5 AND R7 AND R4

A relationship table is compiled based on the assignments of Table 10. Within the first column, Table 10 indicates that "a>b" is assigned to R1. "a>c" is assigned to R2, and so on.

Table 11 illustrates the resulting relationship table.

TABLE 11

| | a | b | c | d | e |
|---|---|---|---|---|---|
| R1 | a > b | b > a | c > a | d > a | e > a |
| R2 | a > c | b > c | c > b | d > b | e > b |
| R3 | a < d | b < d | c < d | d < c | e < c |
| R4 | a < e | b < e | c < e | d < e | e < d |
| R5 | a > d | b > d | c > d | d > c | e > c |
| R6 | a > e | b > e | c > e | d > e | e > d |
| R7 | a < b | b < a | c < a | d < a | e < a |
| R8 | a < c | b < c | c < b | d < b | e < b |

The relationship table is filled in accordance with the actual values of a, b, c, d, and e. Then, the parallel condition registers are calculated using equations 19–24. The result vector V1 is calculated as follows:

(25) V1=P1 OR P2 OR P3 OR P4 OR P5 OR P6

As already explained, V1 can be examined to find the median value of the set. At least one bit of V1 will be set. The bit position of this bit indicates which of the pixel values is the median.

To find the actual value of the median pixel, it is sometimes necessary to refer to some other data structure. For example, it might be necessary to refer to an actual pixel storage location in video memory. Vector V1 can be used as an index to a lookup table that contains the actual value. Alternatively, the indexed lookup table might contain a reference to a memory location in video memory containing the actual value. In the embodiment described herein, the lookup table contains an offset for each possible value of V1. Each offset indicates the addressing distance, in video memory, from the current pixel to the pixel that has been found to be the median.

It is possible to slightly optimize the procedure given above by eliminating one of the columns from the relationship table. For example, column e could be eliminated from Table 11. If e turns out to be the median value, this can be inferred from the absence of any true values in the result vector-the absence of such values will imply that column e is the median.

The invention is useful in any situation in which it is desired to find a median value from a set of given values. However, the invention is particularly efficient in environments such as video, graphics, and other signal processing environments where it is often desired to calculate median values for a large number of value sets. In this environment, several sets can be processed in parallel using SIMD instructions, thereby greatly increasing the efficiency of the calculations.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of filtering pixels in a graphics image, wherein the pixels have pixel values, comprising the following steps:

defining different sets of pixel values, each set comprising the value of a center pixel and the values of at least some the pixels adjacent to the center pixel;

forming a plurality of bit registers having bit groups corresponding respectively to the different sets of pixel values, each bit group having bit positions corresponding respectively to different individual ones of the pixel values of the corresponding set, wherein bits in different bit registers at bit positions corresponding to a particular one of the pixel values indicate the truth or falsity of different possible relationships between the particular pixel value and other individual ones of the pixel values in the same set;

logically ANDing different combinations of the bit registers to form a plurality of parallel condition registers having bit positions corresponding respectively to different individual ones of the pixel values of the different sets;

evaluating the parallel condition registers to determine the median values of the different sets, wherein a true value at any particular bit position in any of the parallel condition registers indicates that the pixel value corresponding to that particular bit position is the median value of its set;

within each set of pixel values, replacing the value of the center pixel with the value of the median value of the set.

2. A method as recited in claim 1, wherein the ANDing step is performed using a single-instruction/multiple-data processor instruction.

3. A method as recited in claim 1, wherein the ANDing and evaluating steps are performed using single-instruction/multiple-data processor instructions.

4. A method as recited in claim 1, wherein the evaluating step comprises logically ORing the parallel condition registers to produce a result register having bit positions corresponding respectively to different individual ones of the pixel values, wherein a true value at any particular bit position of the result register indicates that the pixel value corresponding to that particular bit position is the median value of its set.

5. A method as recited in claim 1, wherein the evaluating step comprises logically ORing the parallel condition registers to produce a result vector having bit positions corresponding respectively to different individual ones of the pixel values, wherein a true value at any particular bit position of the result vector indicates that the pixel value corresponding to that particular bit position is the median value of its set;

the method comprising a further step of indexing a lookup table with the result vector.

6. A method as recited in claim 1, wherein the bit registers and parallel condition registers have bit positions corresponding to all but one of the pixel values of any given set, and wherein an absence of a true value in the parallel condition registers indicates that said one of the pixel values is the median.

7. A method as recited in claim 1, wherein the bits at bit positions corresponding to a particular one of the pixel values indicate the truth or falsity of all possible relationships between the particular pixel value and all other individual ones of the pixel values.

8. A method as recited in claim 1, wherein each bit indicates whether one of the pixel values is greater than another of the pixel values.

9. A method of finding a median value from a plurality of given values, comprising the following steps:

forming a plurality of bit registers having bit positions corresponding respectively to different individual ones of the given values, wherein bits in different bit registers at bit positions corresponding to a particular one of the given values indicate the truth or falsity of different possible relationships between the particular given value and other individual ones of the given values;

logically ANDing different combinations of the bit registers to form a plurality of parallel condition registers having bit positions corresponding respectively to different individual ones of the given values;

evaluating the parallel condition registers to determine the median value, wherein a true value at any particular bit position in any of the parallel condition registers indicates that the given value corresponding to that particular bit position is the median value.

10. A method as recited in claim 9, wherein the ANDing step is performed using a single-instruction/multiple-data processor instruction.

11. A method as recited in claim 9, wherein the ANDing and evaluating steps are performed using single-instruction/multiple-data processor instructions.

12. A method as recited in claim 9, wherein the evaluating step comprises logically ORing the parallel condition resisters to produce a result register having bit positions corresponding respectively to different individual ones of the given values, wherein a true value at any particular bit position of the result register indicates that the given value corresponding to that particular bit position is the median value.

13. A method as recited in claim 9, wherein the evaluating step comprises logically ORing the parallel condition registers to produce a result vector having bit positions corresponding respectively to different individual ones of the given values, wherein a true value at any particular bit position of the result vector indicates that the given value corresponding to that particular bit position is the median value;

the method comprising a further step of indexing a lookup table with the result vector.

14. A method as recited in claim 9, wherein the bit positions correspond to all but one of the given values, and wherein an absence of a true value in any of the parallel condition registers indicates that said one of the given values is the median.

15. A method as recited in claim 9, wherein the bits at bit positions corresponding to a particular one of the given values indicate the truth or falsity of all possible relationships between the particular given value and all other individual ones of the given values.

16. A method as recited in claim 9, wherein each bit indicates whether one of the given values is greater than another of the given values.

17. A method of finding median values from different sets of given values, comprising the following steps:

forming a plurality of bit registers having bit groups corresponding respectively to the different sets of given values, each bit group having bit positions corresponding respectively to different individual ones of the given values of the corresponding set, wherein bits in different bit registers at bit positions corresponding to a particular one of the given values indicate the truth or falsity of different possible relationships between the particular given value and other individual ones of the given values in the same set;

logically ANDing different combinations of the bit registers to form a plurality of parallel condition registers having bit positions corresponding respectively to different individual ones of the given values of the different sets;

evaluating the parallel condition registers to determine the median values of the different sets, wherein a true value at any particular bit position in any of the parallel condition registers indicates that the given value corresponding to that particular bit position is the median value of its set.

18. A method as recited in claim 17, wherein the ANDing step is performed using a single-instruction/multiple-data processor instruction.

19. A method as recited in claim 17, wherein the ANDing and evaluating steps are performed using single-instruction/multiple-data processor instructions.

20. A method as recited in claim 17, wherein the evaluating step comprises logically ORing the parallel condition registers to produce a result register having bit positions corresponding respectively to different individual ones of the given values, wherein a true value at any particular bit position of the result register indicates that the given value corresponding to that particular bit position is the median value of its set.

21. A method as recited in claim 17, wherein the evaluating step comprises logically ORing the parallel condition registers to produce a result vector having bit positions corresponding respectively to different individual ones of the given values, wherein a true value at any particular bit position of the result vector indicates that the given value corresponding to that particular bit position is the median value of its set;

the method comprising a further step of indexing a lookup table with the result vector.

22. A method as recited in claim 17, wherein the bit registers and parallel condition registers have bit positions corresponding to all but one of the given values of any given set, and wherein an absence of a true value in the parallel condition registers indicates that said one of the given values is the median.

23. A method as recited in claim 17, wherein the bits at bit positions corresponding to a particular one of the given values indicate the truth or falsity of all possible relationships between the particular given value and all other individual ones of the given values.

24. A method as recited in claim 17, wherein each bit indicates whether one of the given values is greater than another of the given values.

25. One or more computer-readable storage media containing instructions for finding a median pixel from a plurality of pixels, the instructions being executable to perform steps comprising:

forming a plurality of bit registers having bit positions corresponding respectively to different individual ones of the pixels, wherein bits in different bit registers at bit positions corresponding to a particular one of the pixels indicate the truth or falsity of different possible value relationships between the particular pixel and other individual ones of the pixels;

logically ANDing different combinations of the bit registers to form a plurality of parallel condition registers having bit positions corresponding respectively to different individual ones of the pixels;

evaluating the parallel condition registers to determine the median pixel, wherein a true value at any particular bit position in any of the parallel condition registers indicates that the pixel corresponding to that particular bit position is the median pixel.

26. One or more computer-readable storage media as recited in claim 25, wherein the ANDing step is performed using a single-instruction/multiple-data processor instruction.

27. One or more computer-readable storage media as recited in claim 25, wherein the ANDing and evaluating steps are performed using single-instruction/multiple-data processor instructions.

28. One or more computer-readable storage media as recited in claim 25, wherein the evaluating step comprises logically ORing the parallel condition registers to produce a result register having bit positions corresponding respectively to different individual ones of the pixels, wherein a true value at any particular bit position of the result register indicates that the pixel corresponding to that particular bit position is the median pixel.

29. One or more computer-readable storage media as recited in claim 25, wherein the evaluating step comprises logically ORing the parallel condition registers to produce a result vector having bit positions corresponding respectively to different individual ones of the pixels, wherein a true value at any particular bit position of the result vector indicates that the pixel corresponding to that particular bit position is the median pixel;

the steps further comprising a step of indexing a lookup table with the result vector to find a value of the median pixel.

30. One or more computer-readable storage media as recited in claim 25, wherein the bit positions correspond to all but one of the pixels, and wherein an absence of a true value in any of the parallel condition registers indicates that said one of the pixels is the median.

31. One or more computer-readable storage media as recited in claim 25, wherein the bits at bit positions corresponding to a particular one of the pixels indicate the truth or falsity of all value possible relationships between the particular pixel and all other individual ones of the pixels.

32. One or more computer-readable storage media as recited in claim 25, wherein each bit indicates whether one of the pixels has a value greater than the value of another of the pixels.

33. A computer comprising:

a processor capable of performing single-instruction/multiple-data operations;

a plurality of bit registers having bit groups corresponding respectively to different sets of pixel values, each bit group having bit positions corresponding respectively do different individual ones of the pixels of the corresponding set, wherein bits in different bit registers at bit positions corresponding to a particular one of the pixels indicate the truth or falsity of different possible value relationships between the particular pixel value and other individual ones of the pixels in the same set;

a plurality of parallel condition registers having bit groups corresponding respectively to the different sets of pixel values, each bit group having bit positions corresponding respectively do different individual ones of the pixels of the corresponding set;

the processor being programmed to logically AND different combinations of the bit registers and to place the results in the parallel condition registers, said logical ANDing being performed as part of a single-instruction/multiple-data operation;

the processor being further programmed to evaluate the parallel condition registers to identify the median pixel, wherein a true value at any particular bit position in any of the parallel condition registers indicates that the pixel corresponding to that particular bit position is the median pixel of its set.

34. A computer as recited in claim 33, wherein the processor uses one or more single-instruction/multiple-data processor operations to evaluate the parallel condition registers.

35. A computer as recited in claim 33, further comprising a result register having bit groups corresponding respectively to the different sets of pixel values, each bit group having bit positions corresponding respectively do different individual ones of the pixels of the corresponding set, wherein the processor evaluates the parallel condition registers by logically ORing the parallel condition registers and placing the results in the result register, wherein a true value at any particular bit position of the result register indicates that the pixel corresponding to that particular bit position is the median pixel of its set, said logical ORing being performed as part of a single-instruction/multiple-data operation.

36. A computer as recited in claim 33, further comprising a result register having bit groups corresponding respectively to the different sets of pixel values, each bit group having bit positions corresponding respectively do different individual ones of the pixels of the corresponding set, wherein the processor evaluates the parallel condition registers by logically ORing the parallel condition registers and placing the results in the result register, wherein a true value at any particular bit position of the result register indicates that the pixel corresponding to that particular bit position is the median pixel of its set, said logical ORing being performed as part of a single-instruction/multiple-data operation; the processor being further programmed to index a lookup table with the result of the logical ORing to find median pixel values.

37. A computer as recited in claim 33, wherein the processor evaluates the parallel condition registers by logically ORing the parallel condition registers to produce a result vector having bit groups corresponding respectively to the different sets of pixel values, each bit group having bit positions corresponding respectively do different individual ones of the pixels of the corresponding set;

wherein a true value at any particular bit position of the result vector indicates that the pixel corresponding to that particular bit position is the median pixel of its set;

said logical ORing being performed as part of a single-instruction/multiple-data operation.

38. A computer as recited in claim 33, wherein each bit of the bit registers indicates whether one of the pixels is greater than another of the pixels.

* * * * *

UNITED STATES PATENT AND TRADEMARK OFFICE
CERTIFICATE OF CORRECTION

PATENT NO. : 6,163,324
DATED : December 19, 2000
INVENTOR(S) : Marc Holder et al.

Page 1 of 1

It is certified that error appears in the above-identified patent and that said Letters Patent is hereby corrected as shown below:

Column 10,
Line 49, change "arc" to -- are --.

Column 14,
Line 19, change "resisters" to -- registers --.

Signed and Sealed this

Sixteenth Day of October, 2001

Attest:

*Nicholas P. Godici*

NICHOLAS P. GODICI
*Attesting Officer*   *Acting Director of the United States Patent and Trademark Office*